United States Patent
Welker

(10) Patent No.: US 9,836,707 B2
(45) Date of Patent: Dec. 5, 2017

(54) VISUAL PATHFINDER FOR PRODUCT STRUCTURE RECURSIONS

(75) Inventor: Gerhard Welker, Muehlhausen (DE)

(73) Assignee: SAP SE, Walldorf (DE)

(*) Notice: Subject to any disclaimer, the term of this patent is extended or adjusted under 35 U.S.C. 154(b) by 1837 days.

(21) Appl. No.: 12/849,562

(22) Filed: Aug. 3, 2010

(65) Prior Publication Data

US 2012/0035886 A1 Feb. 9, 2012

(51) Int. Cl.
*G06Q 10/06* (2012.01)
*G06Q 10/08* (2012.01)

(52) U.S. Cl.
CPC .......... *G06Q 10/06* (2013.01); *G06Q 10/08* (2013.01); *G06Q 10/087* (2013.01)

(58) Field of Classification Search
CPC ....... G06Q 10/06; G06Q 10/08; G06Q 10/087
See application file for complete search history.

(56) References Cited

U.S. PATENT DOCUMENTS

| | | | | |
|---|---|---|---|---|
| 5,375,125 A | * | 12/1994 | Oshima et al. | 714/38.13 |
| 5,634,113 A | * | 5/1997 | Rusterholz | 716/106 |
| 5,821,937 A | * | 10/1998 | Tonelli | H04L 41/12 709/225 |
| 6,499,026 B1 | * | 12/2002 | Smith | G06F 17/30011 |
| 2002/0143665 A1 | * | 10/2002 | Santos et al. | 705/28 |
| 2006/0020504 A1 | * | 1/2006 | Jasthi | G06Q 10/087 705/7.41 |
| 2006/0089865 A1 | * | 4/2006 | Mazur | G06Q 10/08 703/6 |
| 2007/0094239 A1 | * | 4/2007 | Catucci | G06Q 10/087 |
| 2009/0138843 A1 | * | 5/2009 | Hinton | G06F 8/74 717/101 |

OTHER PUBLICATIONS

2BizBox, "2BizBox Documentation," more specifically, "2BizBox Documentation: Audit Recursive BOM," as found on the website of http://doc.servasoftware.com/ published on Dec. 31, 2008.*
Tarjan, Robert Endre. "Data structures and network algorithms." Society for industrial and Applied Mathematics, 1983.*
Tarjan, Robert. "Depth-first search and linear graph algorithms." SIAM journal on computing 1.2 (1972): 146-160.*

* cited by examiner

Primary Examiner — Asfand Sheikh

(57) ABSTRACT

A system and method to identify recursion in a virtual product structure. Initially, the virtual product structure is analyzed to identify the existence of a recursion. Once a recursion is identified, a graphical representation of the virtual product structure is generated and displayed to graphically exposure the recursion. Other embodiments are also described and claimed.

5 Claims, 2 Drawing Sheets

VISUAL PATHFINDER FOR PRODUCT STRUCTURE RECURSIONS

FIELD

Embodiments relate to manufacturing resource planning. More specifically, embodiments relate to recursion analysis for discrete industry product structures.

BACKGROUND

Manufacturing resource planning (MRP) typically, products are modeled as a bill of materials (BOM). Traditional BOMs have a header material and a number of item materials that comprises the structure defined in the header. Any particular assembly may have a BOM with one or more child BOMs corresponding to items within the parent BOM. For purposes of flexibility, configurable BOMs, which permit the value of the header or items to be subsequently defined from a group of possible options have been created. Additionally, some BOMs have items, which correspond to a class, where the class is a set of possible items that may be substituted for the item within the BOM.

A recursion exists within the product structure when a lower level item is the same as a higher level item within the structure. This may happen as a result of entry errors by, e.g. a product engineer who has incorrectly changed the product structure such as adding a component or replacing a material such that a lower order item is the same as a higher order item, or as a result of simplifying assumptions made for performance reasons in the MRP software. For example, typically, for performance reasons within a variable product structure having, e.g. three variants, a first variant with item 1, a second variant with item 1 and item 2, and a third variant with item 1 and item 3. Variants 1, 2 and 3 are all presumed to have children. Item 1, item 2, and item 3 could thus, if item 2 in fact includes the header material of variant 1 or variant 3, a recursion (which does not exist in practice) appears to exist from the point of view of the MRP software. Similarly, the MRP software does not consider effectivity thus, if after a certain date a header material is moved to an item material going forward, this will nevertheless create a recursion from the point of view of the MRP software.

While recursions are possible in the context of a process in manufacturing where some of the header material may be used to kick off e.g., the next batch in the process, in the manufacture of discrete products real recursions are not possible. As a practical matter, recursions in the virtual products structure are highly problematic in connection with MRP and manufacturing generally. When a recursion occurs, either real or virtual within the virtual products structure the MRP run fails and production cannot begin until the recursion is identified, resolved, and the MRP run is able to complete.

Some recursion analysis tools exist which generally amount to providing a list of steps in an application log. However, the steps are not listed in any order that facilitates the understanding of the recursion and in the case of complex multiple recursion cycles regarding, for example, the same material, it is very difficult to understand the listing and very complex to translate the information into a coherent form that permits resolution of the recursion. The fact that such product recursions can bring manufacturing to a halt, is a very significant problem in the discrete manufacturing industry.

SUMMARY

A system and method to identify recursion in a virtual product structure is disclosed. Initially, the virtual product structure is analyzed to identify the existence of a recursion. Once a recursion is identified, a graphical representation of the virtual product structure is generated and displayed to graphically exposure the recursion.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
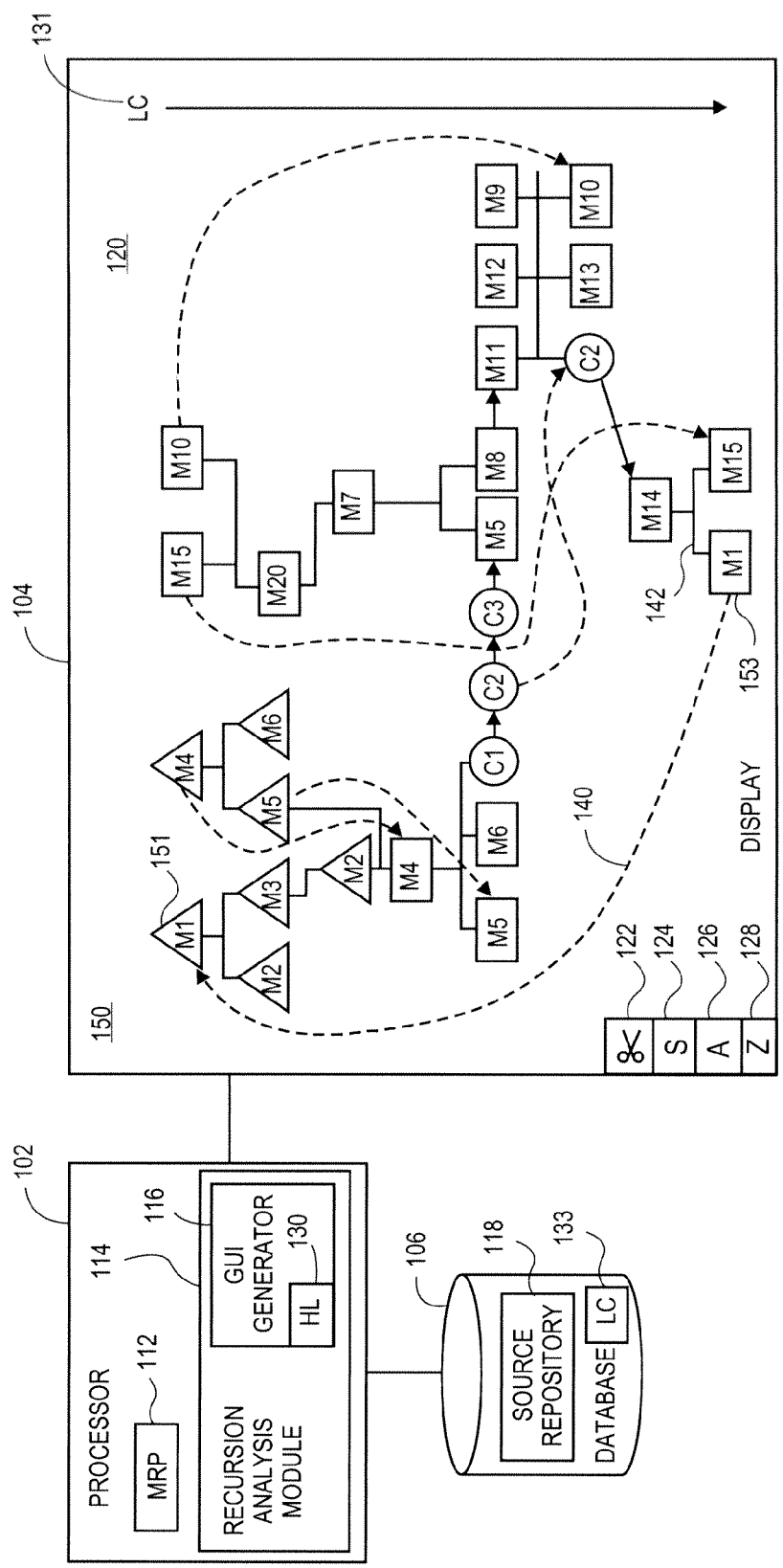
FIG. 1 is a block diagram of a system according to one embodiment of the invention.

FIG. 1 is a block diagram of a system according to one embodiment of the invention. A processor 102 is coupled to an electronic display 104 and the persistent storage unit, such as database 106. Database 106 may include a source repository 118 which may include standard bills of materials (BOMs), configurable BOMs, and classes and other types of manufacturing source documents defining virtual product structures. Processor 102 may execute a manufacturing resource planning (MRP) package 112, which acts as the source materials from source repository 118 to perform manufacturing resource planning.

This will result in a never ending loop and cause the algorithm to fail. During, for example, an MRP run, the structure is processed from lowest level to highest level. The lowest level contains those "top" materials that are not used in other BOMs. The MRP run explodes the BOMs that are not used in other BOM assemblies to retrieve a quantity of the BOM components. This effectively increases the dependent quantities of item materials. The process then continues with the next lower level. The levels are assigned level codes from low to high. It is important to process level 000 before level 001 because processing of level 000 may increase the dependent requirements of level 001 materials.

Level codes are retained in a database table 133 retained in database 106. The level codes are considered master data assigned on a client level. In one embodiment, level codes are integers with a maximum value e.g., three digits that represent a maximum production depth. Thus, the level code represents the depth within a virtual product structure such that a header material must have a lower code than its item materials. Recursion causes a violation of this rule because a material involved in the recursion must have a level code both higher and lower than itself. For example, material M1 151 would have a level code of 000 while material M1 153 would have a level code of 007 (the maximum production depth of this example). This will result in a never ending loop and cause the algorithm to fail.

A recursion analysis module 114 may also execute on processor 102 to identify recursions existing in a virtual product structure as defined by the various source documents. One common algorithm for recursion analysis is described in Tarjan, Robert Endre: *Depth-First Search and Linear Graphic Algorithms*, Journal on Computing Bd. 1, Society for Applied and Industrial Mathematics, 1972, S. 146-160, ISSN: 1095-7111; and Tarjan, Robert Endre: *Data Structures and Network Algorithms, Society for Industrial and Applied Mathematics*, 1983, ISBN: 0898711878.

Graphical user interface (GUI) generator 116 generates a graphical representation 120 of the virtual products structure on electronic display 104. Level code 131 increase with increasing depth within the virtual product structure. A highlighting module 130 within graphical user interface generator 116 highlights recursions within the graphical representation 120 of the virtual products structure. In this example, the highlighting is represented as dotted arrows, which may be selected to be of a color, such as red, that stands out when the product structure is displayed. However, as used herein, highlighting is deemed to include any manner in which the recursion can be made to stand out from the remainder of the structure. For example, color changes, font changes, style changes, etc.

In one embodiment, GUI generator 116 displays different types of source documents or source groups as different shapes or different colors. For example, triangles may be used for configurable BOMs, while rectangles are used for traditional static BOMs and circles may be used for classes. Other embodiments, distinction between different source types may be indicated by color differences instead of or in addition to shape differences.

Additionally, in some embodiments, different source groups are responsible for maintaining portions of the total virtual structures. For example, materials experts (e.g., procure materials but know little of final product), construction experts (e.g., engineers), sales persons (may make last minute configuration changes), etc. may all contribute to the ultimate virtual product structure. Accordingly, in one embodiment color and/or shape of the graphical symbols may be used to indicate which group contributed that element to the structure. This allows the source group of a recursion to be readily identified. Then that group can be directly notified of the recursion and asked to resolve it. This ensures that the group with the correct expertise can be used to resolve the recursion.

In some embodiments, the user may be permitted to modify the product structure within the GUI 150 such as by severing a relationship causing a recursion. For example, recursion 140 is caused by the relationship 142 between M14 and M1. In one embodiment, by selecting relationship 142, e.g. by mousing to it and clicking on it, a user may then sever that relationship by subsequently clicking on the cut soft button 122. The user may then reanalyze the structure once a relationship is severed by clicking on the analyze soft button 126, to see if any recursions still exist. Assuming the recursions have been resolved, the user may then select the save soft button 124 to save the product structure as modified back to database 106. Other recursions may be addressed in the same way.

Alternatively, in some embodiments the user may click on a material such as material M1. The GUI will bring up a dialog box, which allows the user to select by, for example, radio buttons to "allow recursion" that product material. Allowing recursion in M1 will then result in the disappearance of recursion 140 from the graphical representations. Such allowance of recursions is appropriate where the simplifying assumptions of the MRP software rather than actual physical recursion is causing the recursion in the virtual product structure. Again other recursions may be handled by allowing the recursion or deleting the recursion relations.

As structures become increasingly complex, it may be desirable to permit subsections of the structures to be manipulated separately. In that connection, some embodiments provide for the selection of a subsection of a structure and then a zoom to that subsection. For example, a zoom soft button 128 may be provided to zoom in on a particular recursion selected. In some embodiments, a slider may be provided to provide a degree of zoom.

Various embodiments may also permit the addition or change of materials within the product structure to resolve recursions or merely to adjust the product structure to be consistent with intended manufacturing changes.

Figure 2:
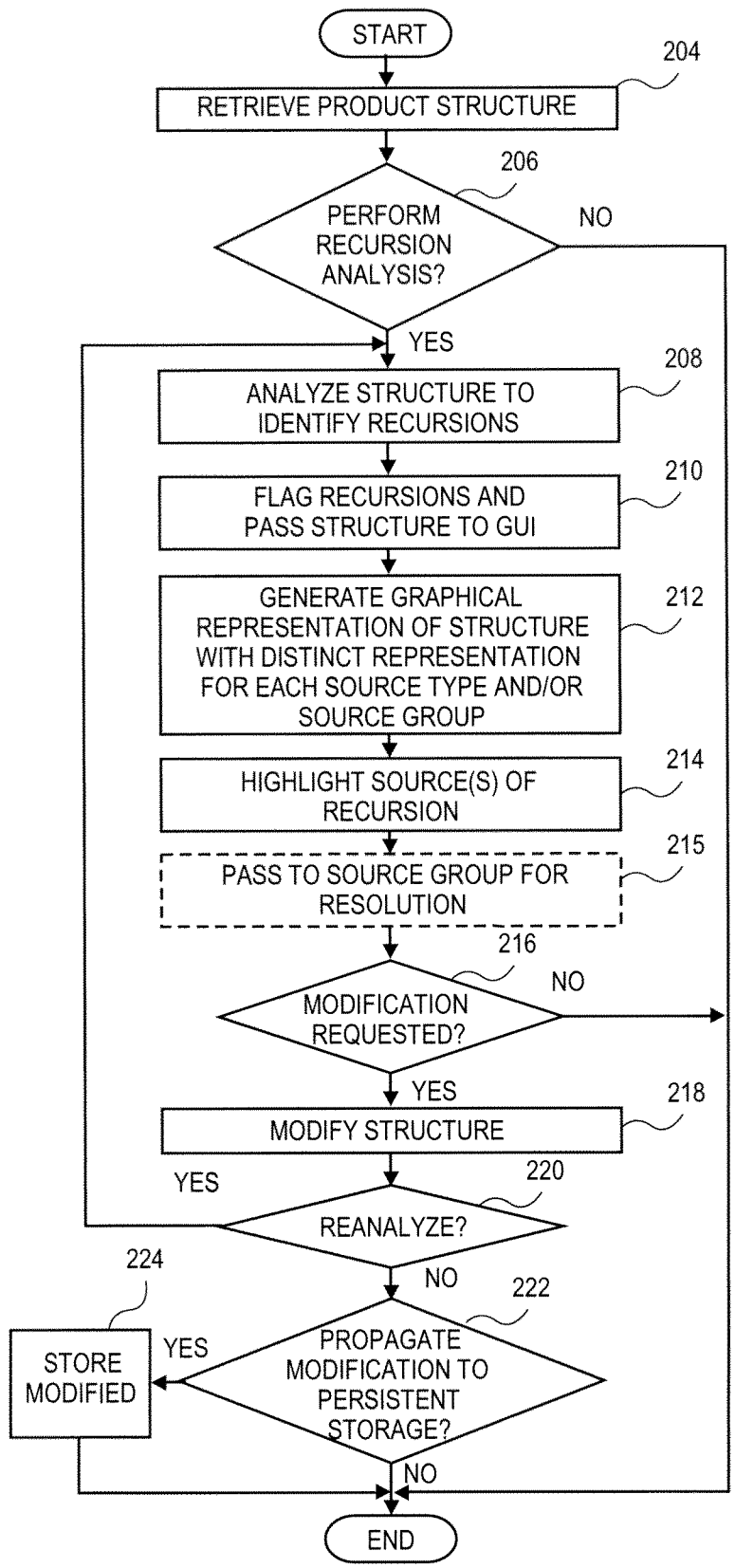
FIG. 2 is a flow diagram of operation in one embodiment of the invention.

FIG. 2 is a flow diagram of operation in one embodiment of the invention. At block 204, the virtual product structure is retrieved from persistent storage. A decision of whether to perform recursion analysis occurs at block 206. If recursion analysis is to be performed, the structure is analyzed to identify recursions at block 208. The recursions are flagged and the structure is passed to the GUI at block 210. At block 212, a graphical representation of the structure with a distinct representation for each material source type is generated. For example, configurable BOMs may be represented as one shape or color, traditional BOMs have another shape or color, and classes as yet another shape or color.

At block 214 sources or recursions are highlighted within the graphical representation. Optional block 215 permits the information regarding the recursion to be sent to a source group that caused the recursion. In such case the source group may resolve the recursion by, for example, requesting a modification. It is also possible for modification to resolve recursion to be handled centrally without involvement of the source group. At block 216 a determination is made if the user has requested a modification of the virtual product structure. If a modification has been requested, the structure is modified at block 218 consistent with the request. The modification may be explicit such as the severing of a relationship or removal or change of material. But the modification may also be merely the allowance of recursions as to a particular material, which does not effect the product structure but may eliminate the display of one or more recursions.

A decision is made at block 220 whether to reanalyze the modified structure. If no reanalysis is requested, determination is made whether to propagate the modifications to persistent storage at block 222. If the modifications are to be persisted, the modified structure is stored in the persistent storage at block 224. If no recursion analysis is to be performed or if the modification is not requested or after the modification is performed and propagated to persistent storage, the process ends.

In one embodiment, the recursion analysis may be integrated into an MRP run. For example, the MRP run may begin prior to block 204 and complete once recursions have resolved or recursion analysis has been declined (FIG. 2). In another embodiment, the recursion analysis may be a stand alone application called during e.g., product structure maintenance, product updates, etc.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
analyzing, in a computer, a virtual product structure, the virtual product structure corresponding to a physical product, to identify a recursion in the product structure, a recursion existing when a lower level item in the product structure is the same as a higher level item in the product structure, wherein analyzing comprises:
identifying a relation that causes the recursion;
generating a graphical representation of the product structure exposing the recursion;
displaying the graphical representation within a graphical user interface on an electronic display;
severing the relation that causes the recursion in the graphical user interface; and
propagating the severing to a persistent storage of the virtual product structure.

2. A method comprising:
analyzing, in a computer, a virtual product structure, the virtual product structure corresponding to a physical product, to identify a recursion in the product structure, a recursion existing when a lower level item in the product structure is the same as a higher level item in the product structure;
generating a graphical representation of the product structure exposing the recursion, wherein generating comprises:
defining a distinct representation for each source type of data contributing to the virtual product structure; and
displaying the graphical representation within a graphical user interface on electronic display.

3. The method of claim 2 wherein the distinct representation is distinct in at least one of shape and color.

4. A system comprising:
a processor;
a recursion analysis module to execute on the processor to identify a recursion in a virtual product structure;
an electronic display coupled to the processor;
a graphical user interface (GUI) to create a representation of a virtual product structure exposing a source of the recursion, wherein the GUI distinctly represents each source type that contributes data to the virtual product structure, and wherein the GUI comprises:
a tool to sever a relationship within the representation of the virtual product that causes the recursion in the graphical user interface; and
a tool to propagate the severing to a persistent storage unit of the virtual product structure; and
the persistent storage unit.

5. A non-transitory computer readable medium having instructions stored therein which when executed by a processor cause the processor to:
analyze, in a computer, a virtual product structure to identify a recursion;
generate a graphical representation of the product structure exposing the recursion;
display the graphical representation within a graphical user interface on an electronic display;
sever a relation that causes the recursion in the graphical user interface; and
propagate the severing to a persistent storage of the virtual product structure.

* * * * *